(12) United States Patent
Aschauer et al.

(10) Patent No.: US 12,034,875 B2
(45) Date of Patent: Jul. 9, 2024

(54) ESTABLISHING SECURE COMMUNICATION WITHOUT LOCAL TIME INFORMATION

(71) Applicant: Siemens Aktiengesellschaft, Munich (DE)

(72) Inventors: Hans Aschauer, Munich (DE); Fabrizio De Santis, Munich (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 17/613,577

(22) PCT Filed: Mar. 31, 2020

(86) PCT No.: PCT/EP2020/059022
§ 371 (c)(1),
(2) Date: Nov. 23, 2021

(87) PCT Pub. No.: WO2020/239294
PCT Pub. Date: Dec. 3, 2020

(65) Prior Publication Data
US 2022/0247581 A1    Aug. 4, 2022

(30) Foreign Application Priority Data

May 31, 2019    (EP) .................................... 19177642

(51) Int. Cl.
*H04L 9/32*    (2006.01)
*H04L 9/08*    (2006.01)
(52) U.S. Cl.
CPC .......... *H04L 9/3271* (2013.01); *H04L 9/0825* (2013.01); *H04L 9/088* (2013.01); *H04L 9/321* (2013.01); *H04L 9/3265* (2013.01)

(58) Field of Classification Search
CPC ..... H04L 9/3271; H04L 9/0825; H04L 9/088; H04L 9/321
See application file for complete search history.

(56) References Cited

U.S. PATENT DOCUMENTS

2002/0104004 A1* 8/2002 Couillard .............. H04L 9/3297
713/178
2004/0103283 A1* 5/2004 Hornak ................. H04L 9/3263
713/175

(Continued)

FOREIGN PATENT DOCUMENTS

WO    2007047846 A2    4/2007
WO    2017167771 A1    10/2017

OTHER PUBLICATIONS

Freeman, Tom, et al. "Server-based certificate validation protocol (SCVP)." RFC 5055. 2007. pp. 1-88.

(Continued)

*Primary Examiner* — Phy Anh T Vu
(74) *Attorney, Agent, or Firm* — Lempia Summerfield Katz LLC

(57) ABSTRACT

Methods and devices are provided for establishing secure communication between the devices without relying on local time information. According to the methods, a client device, which is going to establish the secure communication to a server device, is provided by the server device with a proof of its integrity. The proof of integrity of the server device is issued by a trusted third party (TTP) to which both devices have a trust relation.

11 Claims, 2 Drawing Sheets

(56) References Cited

U.S. PATENT DOCUMENTS

| | | | | |
|---|---|---|---|---|
| 2008/0235513 | A1* | 9/2008 | Foster | H04L 9/3273 |
| | | | | 713/185 |
| 2016/0373418 | A1* | 12/2016 | Ståhl | G06F 21/44 |
| 2017/0230355 | A1* | 8/2017 | Su | H04L 63/0435 |
| 2018/0262329 | A1* | 9/2018 | Nix | H04L 9/0816 |
| 2018/0367530 | A1* | 12/2018 | Mistry | H04L 63/0823 |
| 2019/0208417 | A1* | 7/2019 | Kang | H04W 12/35 |
| 2020/0169406 | A1* | 5/2020 | Liu | H04L 9/30 |
| 2021/0058258 | A1* | 2/2021 | Chen | H04L 9/0618 |

OTHER PUBLICATIONS

PCT International Search Report and Written Opinion of International Searching Authority mailed May 19, 2020 corresponding to PCT International Application No. PCT/EP2020/059022.

Perrig, Adrian, et al. "Timed efficient stream loss-tolerant authentication (TESLA): Multicast source authentication transform introduction." Request for Comments 4082 (2005). pp. 1-22.

Pritikin, M., et al. "Bootstrapping remote secure key infrastructures (BRSKI)." IETF Internet draft (May 2019). pp. 1-43.

* cited by examiner

# ESTABLISHING SECURE COMMUNICATION WITHOUT LOCAL TIME INFORMATION

The present patent document is a § 371 nationalization of PCT Application Serial No. PCT/EP2020/059022, filed Mar. 31, 2020, designating the United States, which is hereby incorporated by reference, and this patent document also claims the benefit of European Patent Application No. 19177642.6, filed May 31, 2019, which is also hereby incorporated by reference.

TECHNICAL FIELD

Various embodiments of the disclosure relate to methods and devices for establishing secure communication between the devices without relying on local, e.g., synchronized time information.

BACKGROUND

Field devices relating to Internet of Things (IoT) or Industry 4.0 applications may be very resource constrained and may not even be equipped with a real-time clock (RTC) because of power, energy, and physical size constraints of the field device. A RTC is a clock device that keeps track of the current date and time. It may be realized in the form of a battery-backed integrated circuit. If necessary, this time information is synchronized with device external components or time sources to adjust the time within a system to have a base notion of time. IoT devices are regularly updated to prevent large-scale disasters if major vulnerabilities are found. This poses a serious problem about how to verify the time validity of digital certificates on all such devices, which are not equipped with a RTC and/or cannot synchronize the date and time information and/or cannot rely on its local time information (e.g., because of an attack the time information cannot be trusted). In fact, it is not possible to verify whether a digital certificate is still valid or has expired without the knowledge about current time. Thus, following security policies, it may not be possible to establish a server-side certificate-based authenticated (TLS-secured) connection to download software or firmware updates to be installed on a field device.

For example, assuming an IoT device without RTC and about to establish a secure connection with a remote server to retrieve critical updates, (e.g., over the transport layer security (TLS) protocol), the IoT device needs to authenticate the remote server using a digital certificate, e.g., the IoT device verifies that the digital certificate provided by the remote server is valid and has not expired. However, the IoT device does not know about the current time.

In principle, the IoT device may retrieve the current time information from a time server, e.g., using the network time protocol (NTP). However, this connection with the time server is also secured, (e.g., over the TLS protocol), otherwise an attacker may send a falsified time information to the IoT device and let it accept expired certificates from the update servers. For doing that, it needs to authenticate the time server using a digital certificate, e.g., the IoT device verifies that the digital certificate provided by the time server is valid and has not expired. However, the IoT device does not know about the current time and cannot authenticate the time server. This is a chicken-and-egg problem.

A known approach of mitigating the problem is to fix an initial time during manufacturing and store it into the IoT device to be used as starting point once the device boots. However, this way only a rough time estimation is provided, and it does not necessarily protect if a digital certificate has expired after this fixed initial time.

A similar approach of mitigating the problem is to estimate the current time by interpolating the time information from multiple time servers. However, this approach will not help much as the connections to the time servers cannot be secured without knowledge about the current time—as explained above.

Another approach of mitigating the problem is to avoid digital certificates and, e.g., share a secret key between each IoT device and a remote time server. There are different ways to implement this approach, and all have major drawbacks.

In a first example, all embedded IoT devices share the same secret key to communicate with the time server. However, if the secret key of any of the devices is compromised, then an attacker may send falsified time information to all devices on the network. This may be even done from the compromised devices themselves.

In a second example, each device has its own secret key shared with the server. However, this is too costly to manage in terms of key management and does not scale well if many IoT devices are deployed.

In any case, using shared secrets (symmetric keys or passwords) either means to dispense with time-based credential revocation or to supplement the credentials with a maximum lifetime. In the first case, this is not better than using certificates without checking for time-based validity; in the latter case, also for symmetric credentials a reliable time information is required.

Infrastructures already relying on symmetric cryptography, utilizing, e.g., Kerberos and a centralized key distribution center (KDC), may leverage the existing infrastructure and provide a single security association between the time server and the KDC, while the KDC may be used to issue tickets to clients for querying the time from the time server. This obviously has the drawback of the necessary support of Kerberos in the field devices but most importantly in the time servers. As they are distributed and globally used, association with specific KDCs is less likely.

A further approach of bootstrapping time information is provided by Bootstrapping Remote Secure Key Infrastructures, BRSKI (IETF draft https://datatracker.ietforg/doc/draft-ietfanima-bootstrapping-keyinfra). The approach leverages the fact that an intelligent electronic device (IED) has manufacturer-installed device and root certificates. During the process of connecting to a remote infrastructure, the device provisionally accepts certificates and utilizes the validity time of the peer certificate to adjust its local clock. Further on, the device establishes a connection to a manufacturer provided server to get a signed voucher containing the new domain certificate to accept the new domain as valid. Once the device gets the voucher with the signature, the device may further adjust the local time based on the signature time in the voucher. In a next act, the device applies for an operational certificate at a local certification authority, CA, and utilizes the issuing time as further adjustment information.

A further approach applied in Precision Time Protocol, PTP (IEEE 1588v2.1) utilizes Timed Efficient Stream Loss-Tolerant Authentication, TESLA (RFC 4082) to distribute time information. TESLA utilizes server generated hash chains to provide delayed authentication. After a certain number of messages, the server releases the utilized key for the integrity protection of these messages in clear, allowing field devices to verify the received information in a delayed manner. The anchor value of the hash chain is to be distributed in a secure (integrity protected) way, e.g., protected by a digital signature or a shared secret.

From the Server-Based Certificate Validation Protocol, SCVP (RFC 5055) it is known to delegate certification path construction and certification path validation to a server. This approach may be used if a field device has constrained local resources. Nevertheless, the connection to the SCVP server is likely to be secured using certificates as well and therefore also depends on a locally available, e.g., synchronized time information.

The approach of Online Certificate Status Protocol (OCSP), stapling is known to allow a server to provide fresh revocation information about its certificate utilized in a connection establishment. The OCSP issuer is either the issuing CA or a delegate, which may be a trusted third party. As the OCSP response information is digitally signed by the OCSP responder, local/synchronized time information is also required to validate the OCSP response.

BRIEF SUMMARY

In view of the above, there is a continued need in the art to address some of the above-identified shortcomings of the prior art. In particular, there is a continued need in the art for establishing secure communications between devices without having to rely on local time information but still utilizing certificates in the initialization of the communication connection.

The scope of the present disclosure is defined solely by the appended claims and is not affected to any degree by the statements within this summary. The present embodiments may obviate one or more of the drawbacks or limitations in the related art.

According to a first aspect, a method of operating a server device for establishing secure communication with a client device is provided. The method includes receiving a query from the client device for a proof of identity of the server device. The query is based on a challenge issued by the client device. The method further includes prompting a trusted third party for the proof of identity of the server device, receiving a response from the trusted third party including the proof of identity of the server device, and sending a response to the query, the response being based on the challenge and being indicative of the proof of identity.

According to a second aspect, a method of operating a client device for establishing secure communication with a server device is provided. The method includes sending a query to the server device for a proof of identity of the server device by a trusted third party. The query is based on a challenge issued by the client device. The method further includes receiving a response to the query being based on the challenge and being indicative of the proof of identity and verifying an identity of the server device using the response.

The method may further include, upon successful verification of the identity of the server device, inquiring an absolute time reference from the server device.

The verifying of the identity of the server device is not based on the absolute time reference.

The challenge may have a limited period of validity, and the identity of the server device may selectively be verified in accordance with the limited period of validity.

The verifying may include verifying a signature issued by the trusted third party using a private key of the trusted third party. The trusted third party may be a Certification Authority (CA).

The query may include the challenge being encrypted using the result of an operation based on a public key of the server device, wherein the public key of the server device may be signed by the trusted third party. The proof of identity of the server device may include the signature issued by the trusted third party using its private key. The signature may include the challenge being decrypted using the private key of the server device, and a public key of the server device. The response may include the proof of identity of the server device being encrypted using the result of an operation based on a public key of the client device, wherein the public key of the client device may be signed by the trusted third party.

The method may further include prompting the trusted third party for the signed public key of the device.

The verifying may include verifying the challenge using a secret key of the client device, and the trusted third party may be a Private Key Generator (PKG).

The query may include the challenge being encrypted using an identity of the server device and a random identity issued by the client device. The proof of identity of the server device may include a secret key issued by the trusted third party. The secret key may be based on the identity of the server device and on the random identity. The response may include the challenge being decrypted using the proof of identity of the server device and being encrypted using an identity of the client device.

The method may further include prompting the trusted third party to provide the secret key of the device based on an identity of the device.

According to a third aspect, a server device is configured to establish secure communication with a client device. The device includes a processing unit configured to receive a query from the client device for a proof of identity of the server device. The query is based on a challenge issued by the client device. The processing unit is further configured to prompt a trusted third party for the proof of identity of the server device, receive a response from the trusted third party including the proof of identity of the server device, and send a response to the query. The response is based on the challenge and indicative of the proof of identity.

The processing unit of the server device may be configured to perform the method of operating the server device for establishing secure communication with the client device according to various embodiments disclosed herein.

According to a fourth aspect, a client device is configured to establish secure communication with a server device. The device includes a processing unit configured to send a query to the server device for a proof of identity of the server device by a trusted third party. The query is based on a challenge issued by the client device. The processing unit is further configured to receive a response to the query being based on the challenge and being indicative of the proof of identity, and verify an identity of the server device using the response.

The processing unit of the client device may be configured to perform the method of operating the client device for establishing secure communication with the server device according to various embodiments disclosed herein.

The client device may be an Internet of Things (IoT) device.

Embodiments of the disclosure are described with reference to the accompanying drawings, in which the same or similar reference numerals designate the same or similar elements.

"Secure communication" as used herein may refer to communication being prevented from being eavesdropped or intercepted by unauthorized parties, for example using methods of encryption.

A "query" and a "response" as used herein may refer to messages being exchanged between the client device and the server device, wherein the response is triggered by the query.

A "challenge" as used herein may refer to information provided by a challenging party to a challenged party in order to trigger a response that is indicative of the challenge, and indicative of a shared secret of the involved parties, or of similar knowledge. For instance, in case of RSA cryptography, the involved parties use asymmetric key pairs for ciphering, and in case of Elliptic Curve Digital Signature Algorithm (ECDSA) cryptography, the involved parties first conclude a key agreement, which in turn leads to a shared secret that is then used for ciphering. For instance, the challenge may be a random number (nonce), a shared secret may be a password merely known by the involved parties, and the response triggered by the challenge may be based on, (e.g., inferred from), the nonce and the password and be encoded using a generally known algorithm. For instance, the challenge may be subjected to a cryptographic function, for example a Message Authentication Code (MAC), which may involve a key that is derived from the password. The challenging party may authenticate the challenged party with the challenging party by reproducing the very same encoding acts.

A "trusted third party" as used herein may refer to a third party facilitating interactions between two other parties who both have a trust relation to the third party.

A "certification authority" (CA) as used herein may relate to a central authority in a context of public-key cryptography which acts as a trusted third party. A CA issues digital certificates which certify ownership of a public key by the named subject of the certificate. The certificate is also a confirmation or validation by the CA that the public key contained in the certificate belongs to the entity noted in the certificate. Other (relying) parties trusting the CA may verify the CA's signature to verify at the same time that a certain public key indeed belongs to whoever is identified in the certificate.

"Public key" and "secret key" as used herein may relate to a key pair used in identity-based encryption, a specific type of public-key cryptography. The former is generally known and represents some unique information about the identity of the user (e.g., the receiver's name).

A "private key generator" (PKG) as used herein may relate to a central authority in a context of identity-based encryption which acts as a trusted third party. A PKG issues secret keys for decryption to every receiving entity, and therefore needs to be trusted by all receiving entities.

A "processing unit" as used herein may relate to a hardware entity of a computing device or a corresponding software entity that is arranged for execution of program instructions. Examples of processing units include microprocessors, microcontrollers, application-specific integrated circuits (ASICs), digital signal processors, virtual processors, processor emulations, and the like.

"Internet of Things" (IoT) as used herein may relate to an extension of Internet connectivity into physical devices and everyday objects. This likely entails a low cost design of IoT devices only requiring a minimum of electronic resources. For instance, it may not be expected that every IoT device is equipped with a real-time clock, RTC.

DETAILED DESCRIPTION

Figure 1:
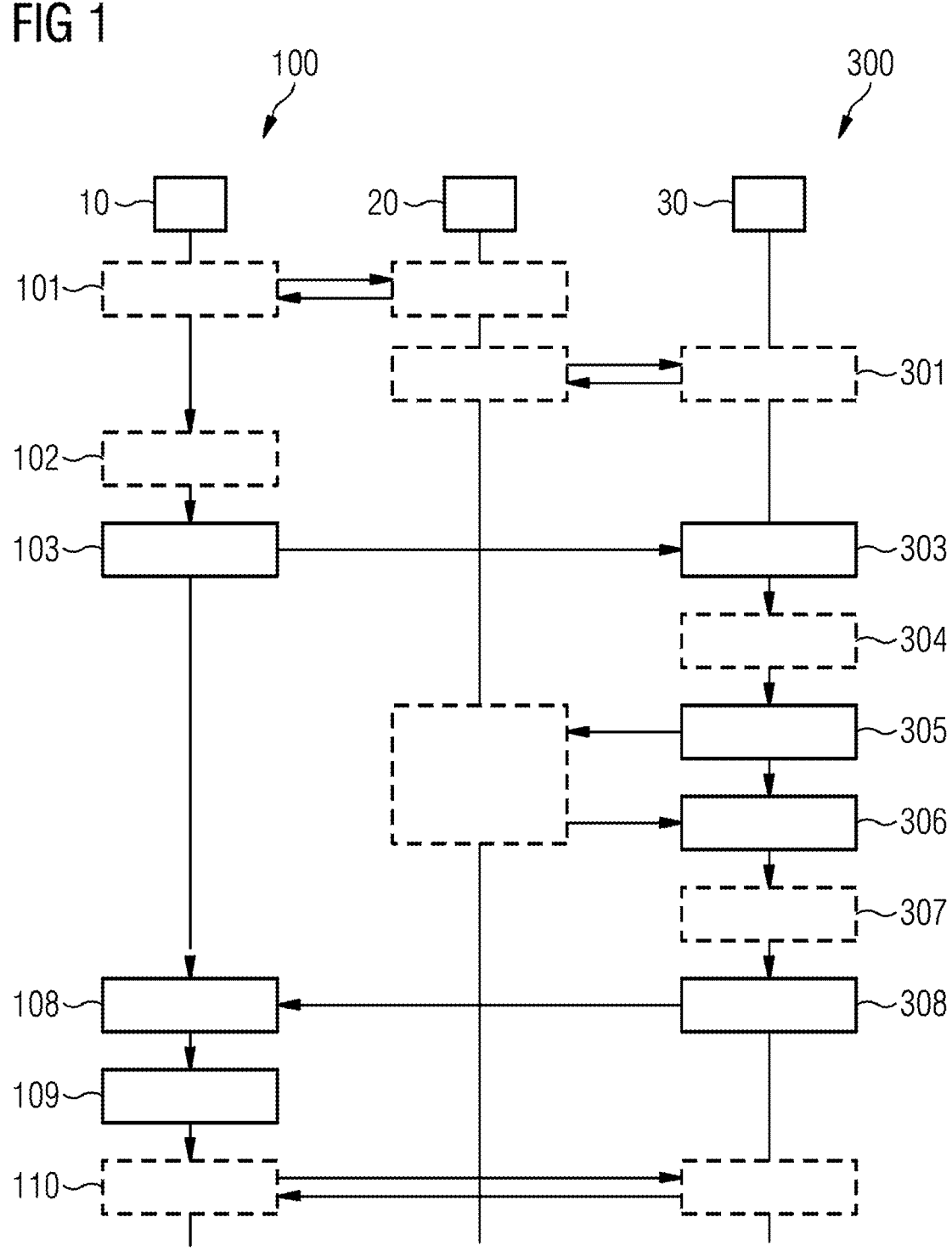
FIG. 1 is a flow diagram illustrating a method of operating a server device for establishing secure communication with a client device, and a method of operating the client device for establishing secure communication with the server device according to embodiments and interacting with each other.

Exemplary embodiments of the disclosure are described with reference to the drawings. While some embodiments are described in the context of specific fields of application, the embodiments are not limited to this field of application. Further, the features of the various embodiments may be combined with each other unless specifically stated otherwise.

The drawings are to be regarded as being schematic representations, and elements illustrated in the drawings are not necessarily shown to scale. Rather, the various elements are represented such that their function and general purpose become apparent to a person skilled in the art.

FIG. 1 is a flow diagram illustrating a method 300 of operating a server device 30 for establishing secure communication with a client device 10, and a method 100 of operating the client device 10 for establishing secure communication with the server device 30 according to embodiments and interacting with each other.

With reference to FIG. 1 (see method acts having bold lines), methods 100, 300 interact with each other in a basic form as follows.

At act 103, the client device 10 sends a query M to the server device 30 for a proof of identity of the server device 30 by a trusted third party 20. Correspondingly, at act 303, the server device 30 receives the query M from the client device 10. The query M is based on a challenge C issued 102 by the client device 10.

At act 305, the server device 30 prompts the trusted third party 20 for the proof of identity of the server device 30.

At act 306, the server device 30 receives a response from the trusted third party 20 including the proof of identity of the server device 30.

At act 308, the server device 30 sends a response R to the query M. Correspondingly, at act 108, the client device 10 receives the response R. The response R is based on the challenge C and indicative of the proof of identity of the server device 30.

At act 109, the client device 10 verifies an identity of the server device 30 using the response R.

Advantageously, client devices 10 may authenticate remote server devices 30 without having local time information.

Advantageously, client devices 10 without an RTC may establish secure connections with remote server devices 30 (e.g., time and update servers).

Advantageously, client devices 10 equipped with an RTC may establish secure connections with remote server devices 30 if the RTC fails to (or is recognized not to) work correctly, as a back-up solution.

Advantageously, client devices 10 equipped with an RTC may perform synchronization/bootstrapping of local time information if the RTC is not battery powered to keep the time across device restarts or shutdowns.

Advantageously, no other client device 10 on the network is affected if the secret key of any client device 10 is compromised, because each client device 10 has its own key without the need of a complex key management like in the case of symmetric keys.

With continuing reference to FIG. 1, the methods 100, 300 may further include the following.

At act 110, the client device 10 may inquire an absolute time reference from the server device 30 upon successful verification 109 of the identity of the server device 30. The verifying of the identity of the server device 30 in the preceding act 109 is, however, not based on the absolute time reference.

The challenge C may have a limited period of validity, and the identity of the server device 30 may selectively be verified 109 in accordance with the limited period of validity.

Advantageously, the limited period of validity (a.k.a. "freshness") of the challenge C prevents replay attacks based on re-use of former appropriate responses R.

Still referring to FIG. 1, in an embodiment drawing upon public key infrastructure, PKI, the generic methods 100, 300 specified above may further be defined as follows:

The trusted third party 20 may be a Certification Authority (CA).

The respective client/server device 10, 30 has a public key pkA, pkB and a private key skA, skB.

The respective public key pkA, pkB may be used either directly or indirectly for encryption.

At acts 101, 301 the respective client/server device 10, 30 may prompt the trusted third party 20, (e.g., the CA), for signing its public key pkA, pkB using the CA's private key skTTP:

pkA⇐Sign(skTTP, pkA)
pkB⇐Sign(skTTP, pkB)

The server device 30 may share its public key pkB with the client device 10, and the client device 10 may share its public key pkA with the server device 30.

The private key skA, skB may be used for decryption.

The query M including the challenge C may be encrypted using the result of an operation based on the public key pkB of the server device 30:

M⇐Enc(pkB, C)

The challenge C may be decrypted 304 from the query M using the private key skB of the server device 30:

C⇐Dec(skB, M)

The proof of identity of the server device 30, to which reference is made at acts 103, 303, 305, 306, 308, and 108, may include, as part of the server device's certificate, a signature S issued by the trusted third party 20 using its private key skTTP. The signature S may include the challenge C and the public key pkB of the server device 30:

S⇐Sign(skTTP, C∥pkB)

The response R, to which reference is made at acts 308, 108, and 109, may include the proof of identity of the server device 30, (e.g., the signature S), and may be encrypted using the result of an operation based on the public key pkA of the client device 10:

R⇐Enc(pkA, S)

Conversely, the signature S may be decrypted from the response R by the client device 10 using the private key skA of the client device 10:

S⇐Dec(skA, R)

At act 109, the verifying may include verifying the signature S issued by the trusted third party 20 using a private key skTTP of the trusted third party 20:

Verify(pkTTP, S)==True

Advantageously, the embodiment works in conventional PKI infrastructures.

Still referring to FIG. 1, in an alternative embodiment drawing upon identity-based encryption, IBE, the generic methods 100, 300 specified above may further be defined as follows:

The trusted third party 20 may be a Private Key Generator (PKG).

The respective client/server device 10, 30 has an identity idA, idB and a secret key skA, skB.

The respective identity idA, idB may be used for encryption.

The server device 30 may share its identity idB with the client device 10, and the client device 10 may share its identity idB with the server device 30.

The respective secret key skA, skB may be used for decryption.

At acts 101, 301 the respective client/server device 10, 30 may prompt the trusted third party 20, (e.g., the PKG), for its secret key kA, kB based on the identity idA, idB of the respective device 10, 30:

kA, PP⇐Issue(idA)
kB, PP⇐Issue(idB)

Along with the respective secret keys kA, kB, further public parameters, PP, may be provided.

The query M including the challenge C may be encrypted using the identity idB of the server device 30 as well as a random identity idR issued by the client device 10:

M⇐Enc(idB∥idR, C, PP)

The client device 10 may share the random identity idR with the server device 30.

The proof of identity of the server device 30, to which reference is made at acts 103, 303, 305, 306, 308, and 108, may include a secret key kBR issued by the trusted third party 20. The secret key kBR is based on the identity idB of the server device 30 and the random identity idR:

kBR, PP⇐Issue(idB∥idR)

At act 307, the challenge C may be decrypted using the proof of identity of the server device 30, (e.g., the secret key kBR of the trusted third party 20):

C⇐Dec(kBR, M, PP)

The response R, to which reference is made at acts 308, 108, and 109, may include the challenge C and may be encrypted using the identity idA of the client device 10:

R⇐Enc(idA, C, PP)

At act 109, the verifying may include verifying the challenge C using the secret key kA of the client device 10:

Dec(kA, R, PP)==C

Advantageously, the embodiment also works in IBE or other types of infrastructures.

Figure 2:
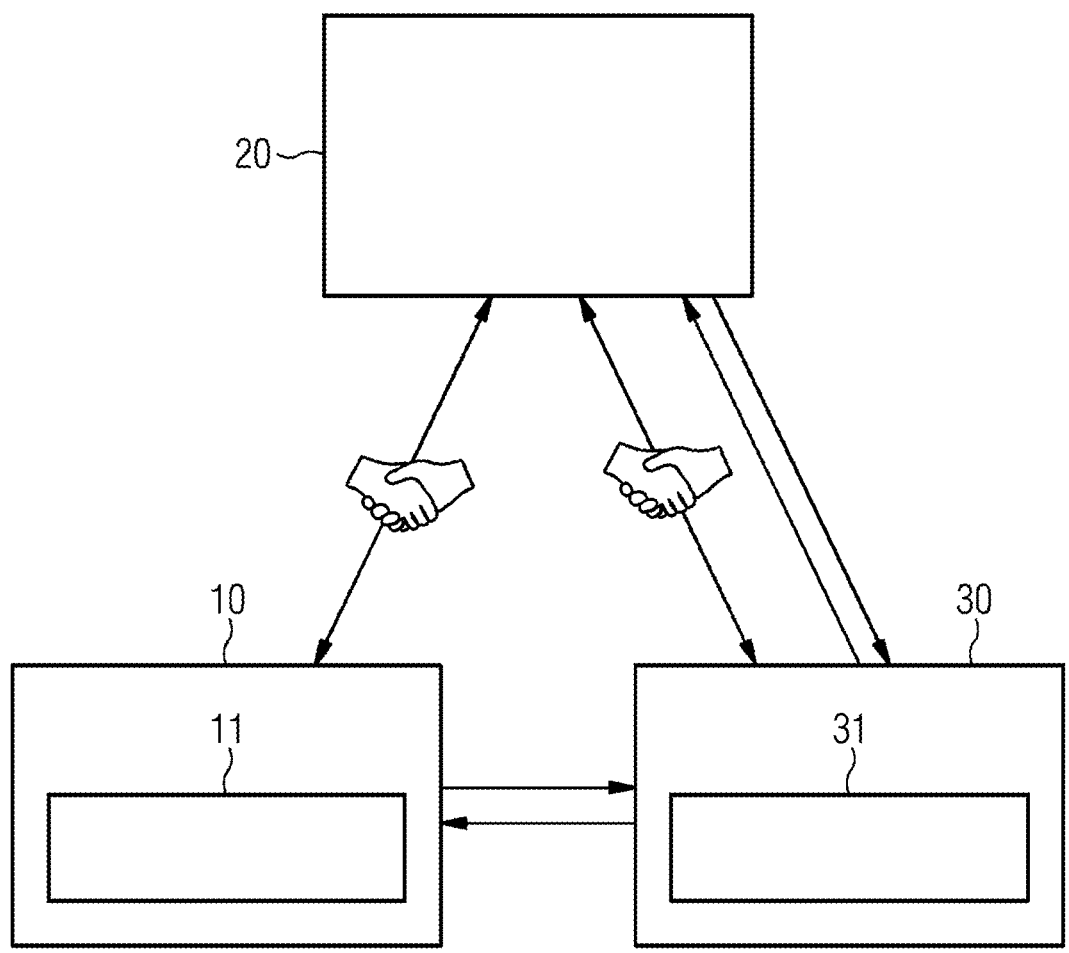
FIG. 2 is a schematic diagram illustrating the client device and the server device according to embodiments and interacting with each other and with a trusted third party.

FIG. 2 is a schematic diagram illustrating the client device 10 and the server device 30 according to embodiments and interacting with each other and with a trusted third party 20.

As shown in FIG. 2, the respective client/server device 10, 30 has a trust relation to the trusted third party 20, as indicated by those arrows being identified with handshake symbols.

With reference to FIG. 2, the respective client/server device 10, 30 configured to establish secure communication with the respective other device 30, 10 includes a respective processing unit 11, 31.

The processing unit 11 is configured to send 103 a query M to the server device 30 for a proof of identity of the server device 30 by a trusted third party 20. Correspondingly, the processing unit 31 is configured to receive 303 the query M. The query M is based on a challenge C issued 102 by the client device 10.

The processing unit 31 is further configured to prompt 305 a trusted third party 20 for the proof of identity of the server device 30, and receive 306 a response from the trusted third party 20 including the proof of identity of the server device 30.

The processing unit 31 is further configured to send 308 a response R to the query M. Correspondingly, the processing unit 11 is further configured to receive 108 a response R to the query M. The response R is based on the challenge C and indicative of the proof of identity.

The processing unit 11 is further configured to verify 109 an identity of the server device 30 using the response R.

The respective processing units 11, 31 may further be configured to perform the respective methods 100, 300 of operating the respective client/server device 10, 30 for establishing secure communication with the respective other device 30, 10 according to various embodiments.

Advantageously, the technical effects and advantages described above in relation with the methods 100, 300 equally apply to the devices 10, 30 having corresponding features.

The client device 10 may be an Internet of Things (IoT) device.

While methods and devices according to various embodiments have been described, the present disclosure may, of course, be carried out in other ways than those specifically set forth herein without departing from the disclosure. The present embodiments are therefore to be considered in all respects as illustrative and not restrictive, and all changes coming within the meaning and equivalency range of the appended claims are intended to be embraced therein.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of operating a remote server device for establishing secure communication with an Internet of Things (IoT) client device, the method being performed by the remote server device, the method comprising:
   receiving a query from the IoT client device for a proof of identity of the remote server device, the query being based on a challenge issued by the IoT client device, wherein the challenge has a predefined limited period of validity to prevent replay attacks;
   prompting a trusted third party for the proof of identity of the remote server device;
   receiving a response from the trusted third party comprising the proof of identity of the remote server device;
   sending a response to the query, the response being based on the challenge and being indicative of the proof of identity of the remote server device; and
   transmitting an absolute time reference from the remote server device to the IoT client device in response to a successful verification of an identity of the remote server device by the IoT client device, wherein the verification is done within the predefined limited period of validity,
   wherein the query comprises the challenge being encrypted using a result of an operation based on a public key of the remote server device, the public key of the remote server device being signed by the trusted third party,
   wherein the proof of identity of the remote server device comprises a signature issued by the trusted third party using a private key of the trusted third party, the signature comprising: (1) the challenge being decrypted using a secret key of the remote server device and (2) the public key of the remote server device, and
   wherein the response comprises the proof of identity of the remote server device being encrypted using a result of an operation based on a public key of the IoT client device, the public key of the IoT client device being signed by the trusted third party.

2. The method of claim 1, further comprising:
   prompting the trusted third party for the signed public key of the remote server device.

3. The method of claim 1, further comprising:
   prompting the trusted third party to provide the secret key of the remote server device based on the identity of the remote server device.

4. A method of operating an Internet of Things (IoT) client device for establishing secure communication with a remote server device, the method being performed by the IoT client device, the method comprising:
   sending a query to the remote server device for a proof of identity of the remote server device by a trusted third party, the query being based on a challenge issued by the IoT client device, wherein the challenge has a predefined limited period of validity to prevent replay attacks;
   receiving a response to the query being based on the challenge and being indicative of the proof of identity of the remote service device;
   verifying the identity of the remote server device using the response without relying on local time information of the IoT client device, wherein the verifying is done within the predefined limited period of validity; and
   receiving an absolute time reference from the remote server device following successful verification of the identity of the remote server device,
   wherein the query comprises the challenge being encrypted using a result of an operation based on a public key of the remote server device, the public key of the remote server device being signed by the trusted third party,
   wherein the proof of identity of the remote server device comprises a signature issued by the trusted third party using a private key of the trusted third party, the signature comprising: (1) the challenge being decrypted using a secret key of the remote server device; and (2) the public key of the remote server device, and
   wherein the response comprises the proof of identity of the remote server device being encrypted using a result of an operation based on a public key of the IoT client device, the public key of the IoT client device being signed by the trusted third party.

5. The method of claim 4, wherein the verifying comprises verifying the signature issued by the trusted third party using the private key of the trusted third party, and
   wherein the trusted third party is a Certification Authority.

6. The method of claim 4, further comprising:
   prompting the trusted third party for the signed public key of the IoT client device.

7. The method of claim 4, wherein the verifying comprises verifying the challenge using a secret key of the IoT client device, and
wherein the trusted third party is a Private Key Generator.

8. The method of claim 7, further comprising:
prompting the trusted third party to provide the secret key of the IoT client device based on an identity of the IoT client device.

9. The method of claim 4, further comprising:
prompting the trusted third party to provide the secret key of the remote server device based on the identity of the remote server device.

10. A remote server device configured to establish a secure communication with an Internet of Things (IoT) client device, the remote server device comprising:
a processing unit configured to:
receive a query from the IoT client device for a proof of identity of the remote server device, the query being based on a challenge issued by the IoT client device, wherein the challenge has a predefined limited period of validity to prevent replay attack;
prompt a trusted third party for the proof of identity of the remote server device;
receive a response from the trusted third party comprising the proof of identity of the remote server device;
send a response to the query, the response being based on the challenge and being indicative of the proof of identity of the remote server device; and
transmit an absolute time reference from the remote server device to the IoT client device in response to a successful verification of an identity of the remote server device by the IoT client device, wherein the verification is done within the predefined limited period of validity,
wherein the query comprises the challenge being encrypted using a result of an operation based on a public key of the remote server device, the public key of the remote server device being signed by the trusted third party,
wherein the proof of identity of the remote server device comprises a signature issued by the trusted third party using a private key of the trusted third party, the signature comprising: (1) the challenge being decrypted using a secret key of the remote server device; and (2) the public key of the remote server device, and wherein the response comprises the proof of identity of the remote server device being encrypted using a result of an operation based on a public key of the IoT client device, the public key of the IoT client device being signed by the trusted third party.

11. A An Internet of Things (IoT) client device configured to establish a secure communication with a remote server device, the IoT client device comprising:
a processing unit configured to:
send a query to the remote server device for a proof of identity of the remote server device by a trusted third party, the query being based on a challenge issued by the IoT client device, wherein the challenge has a predefined limited period of validity to prevent replay attack;
receive a response to the query being based on the challenge and being indicative of the proof of identity of the remote server device;
verify the identity of the remote server device using the response without relying on local time information of the IoT client device, wherein the verification is done within the predefined limited period of validity; and
receive an absolute time reference from the remote server device following successful verification of the identity of the remote server device,
wherein the query comprises the challenge being encrypted using a result of an operation based on a public key of the remote server device, the public key of the remote server device being signed by the trusted third party,
wherein the proof of identity of the remote server device comprises a signature issued by the trusted third party using a private key of the trusted third party, the signature comprising: (1) the challenge being decrypted using a secret key of the remote server device; and (2) the public key of the remote server device, and
wherein the response comprises the proof of identity of the remote server device being encrypted using a result of an operation based on a public key of the IoT client device, the public key of the IoT client device being signed by the trusted third party.

* * * * *